April 21, 1970

W. H. G. RITSCHER
METHOD AND APPARATUS FOR LOW-INERTIA OR INERTIA-FREE TEMPERATURE MEASUREMENT

Filed Nov. 16, 1967

INVENTOR
Werner Horst Gunther Ritscher

United States Patent Office

3,507,152
Patented Apr. 21, 1970

---

3,507,152
METHOD AND APPARATUS FOR LOW-INERTIA OR INERTIA-FREE TEMPERATURE MEASUREMENT
Werner Horst Gunther Ritscher, Baden-Wurttemberg, Germany, assignor to Werner & Pfleiderer, Stuttgart-Feuerbach, Germany, a company of Germany
Filed Nov. 16, 1967, Ser. No. 683,727
Claims priority, application Germany, Dec. 22, 1966, W 43,033
Int. Cl. G01k 7/10
U.S. Cl. 73—341                                3 Claims

---

ABSTRACT OF THE DISCLOSURE

A temperature measuring probe for the low-inertia temperature measurement of a fluid medium. The probe includes a pair of temperature measuring elements having different degrees of thermal contact with the medium. A circuit associated with said elements adds a proportion of the difference in output between said elements to the output of one of the elements to provide a corrected temperature measurement.

---

Figure 1:
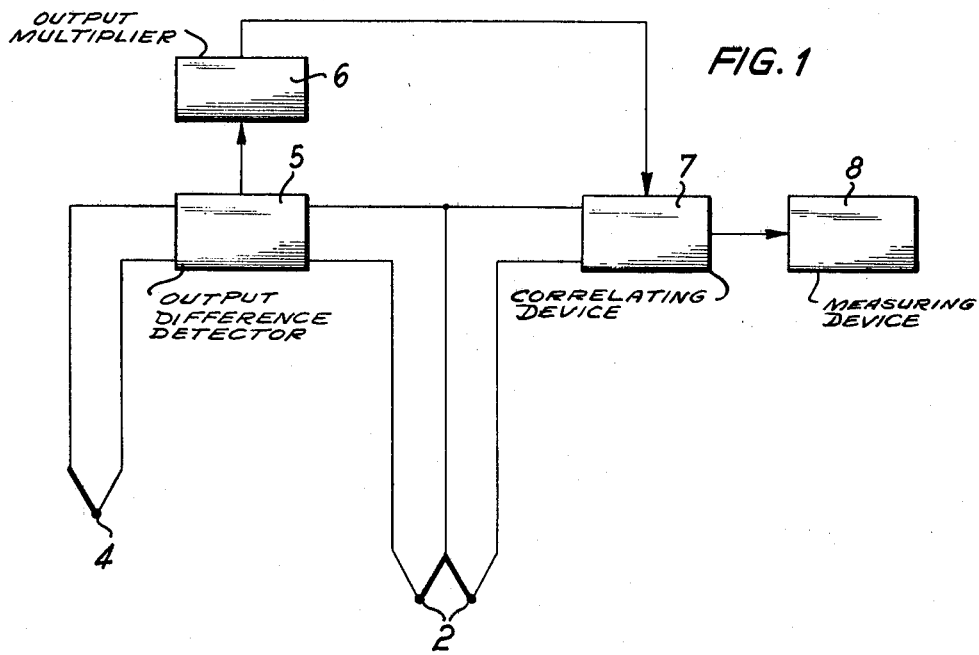

The invention relates to a method and apparatus for low-inertia or inertia-free temperature measurement.

As is known, the measuring inertia of a thermometer probe depends to a large extent on its mass amongst other things and consequently on the thermal capacity. The measuring properties are therefore better the smaller the mass of a thermometer probe.

However, in practice this knowledge cannot be sufficiently exploited insofar as it is necessary to protect the actual measuring element from mechanical and chemical influences, for example, with a protective sheath or the like. Thus due to its inertia, the thermometer probe is not capable of following rapid temperature variations with sufficient accuracy.

The aim of the invention is to provide a method and apparatus for low-inertia or inertia-free temperature measurement which can be exploited in a simple manner and whereby exact temperatures are measured independent of the inertia of the measuring element and the disadvantages of previous methods are eliminated.

In accordance with the invention, this is essentially achieved by arranging measuring elements at different points on the protective sheath of a thermometer probe, the inertia of which is represented by time-variant temperature drops between measuring elements, at least one of which makes optimum contact with the medium to be investigated whilst another only makes contact through the protective sheath, and, depending on the measured temperature drops, a correction is superimposed on the measurement furnished by the first measuring element.

By this means, with a given design of thermometer probe, the magnitude of the correction is strongly dependent on the temperature behaviour of the medium to be investigated, whilst the accuracy of the indication obtained from the temperatures of the two measuring points is substantially independent of the temperature behaviour of the medium to be investigated. The inertia of the thermometer probe due to its mass can thus be exactly compensated by the measures in the invention. Preferably more than two measuring elements are provided for determining the temperature drop of the thermometer probe and evaluating the correction.

To carry out the method in accordance with the invention with a difference detector, a multiplier, a unit for superimposing the correction and a measuring instrument, it is proposed that one or more measuring elements with differing degrees of thermal contact with the medium to be investigated should be mounted in or on the protective sheath of the thermometer probe. The measuring element is advantageously designed as a double thermocouple. A calibration of different types of thermometer probe can be made in accordance with another proposal of the invention by adjusting the amplification factor of the multiplier. It is recommended that the multiplier should take the form of a voltage divider which multiplies the indicated difference by any desired factor.

Figure 2:
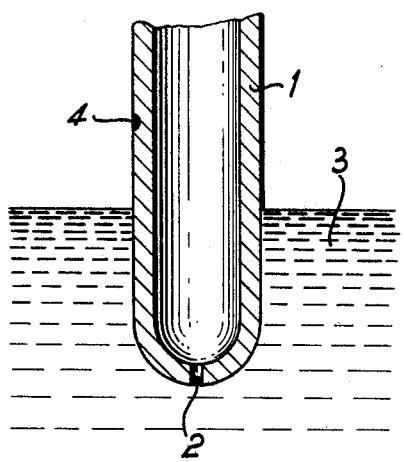
Figure 3:
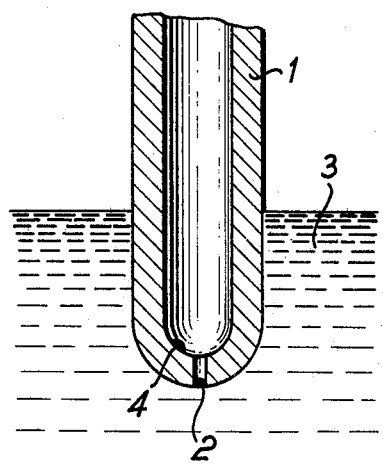

The accompanying drawing depicts a device for carrying out the method in accordance with the invention. It shows:

FIGURE 1 the circuit diagram of an individual measuring element;

FIGURE 2 a schematic representation of a thermometer probe with two measuring elements, and FIGURE 3 an embodiment of a thermometer probe varying from that in FIGURE 2.

At the lowermost point of the tip of a thermometer probe 1 there is a measuring element 2 which makes good thermal contact with the medium 3 to be investigated and is, for example, in the form of a double thermocouple. A second measuring element 4 in the probe 1 makes a poorer thermal contact with the medium 3 and is, for example, a single thermocouple.

The two measuring elements 2 and 4 are connected differentially so that the voltage between them is determined by a difference detector 5. This difference is fed to a multiplier 6 which preferably takes the form of a voltage divider, the difference being multiplied in a simple manner by any desired factor. The multiplier itself furnishes a value proportional to the difference, this value then being added to the value furnished by the other measuring element 1 in a correlating device 7. The resultant quantity is fed to a measuring instrument 8. The magnitude of the factor for the multiplier 6 depends on the design of probe and can be established by calibration for any instrument.

As already mentioned, the mode of operation of the method in accordance with the invention is based on the fact that the values furnished by the measuring element 1 are too low or too high as long as there is thermal flux between the measuring points 2 and 4. The more a steady state is set up between the measuring points 2, 4 and the medium to be investigated, the smaller the difference between the values furnished from the two measuring points 2, 4. When a stationary state is reached the correction is zero so that measurement practically independent of the inertia of the thermometer probe is ensured.

I claim:

1. Apparatus for the low-inertia temperature measurement of a medium comprising a temperature probe having a protective sheath, a pair of measuring elements, means mounting said elements to said sheath whereby said elements have respectively differing degrees of thermo contact with a medium to be measured, and a circuit associated with said elements for measuring the temperature of the medium in accordance with the respective outputs of said elements, said circuit including a difference detector connected with said elements for measuring the difference in output between said elements, an output multiplier connected with said detector, and a correlating device connected with said multiplier and with one of said elements to add the output from said multiplier to a proportion of the output from said one of said elements and provide an output representation of the required temperature measurement.

2. The apparatus of claim 1 characterized in that said one of said elements is a double thermocouple.

3. The apparatus of claim 1 characterized in that said elements are thremocouples and said multiplier is a voltage divider which multiplies the voltage output difference between said elements by any desired factor.

References Cited

UNITED STATES PATENTS 2,266,185  12/1941  Fillo _____ 73—341

FOREIGN PATENTS 149,912  12/1961  U.S.S.R.

LOUIS R. PRINCE, Primary Examiner

D. E. CORR, Assistant Examiner